US007498712B2

(12) United States Patent
Hockaday et al.

(10) Patent No.: US 7,498,712 B2
(45) Date of Patent: Mar. 3, 2009

(54) GRAIN ORIENTATION CONTROL THROUGH HOT PRESSING TECHNIQUES

(75) Inventors: Shepard Lynn Hockaday, Benson, NC (US); Candace Stephenson Barefoot, Dunn, NC (US); George Dane Goodson, Dunn, NC (US); Timothy Glenn King, Coats, NC (US); Ray John Matthews, Willow Spring, NC (US); John David Reece, Jr., Erwin, NC (US); Jeffrey Shaw Smith, Dunn, NC (US); Pimol Ballard Vonkchalee, Apex, NC (US)

(73) Assignee: Energy Conversion Systems Holdings, LLC, Dunn, NC (US)

( * ) Notice: Subject to any disclaimer, the term of this patent is extended or adjusted under 35 U.S.C. 154(b) by 0 days.

(21) Appl. No.: 11/515,467

(22) Filed: Sep. 1, 2006

(65) Prior Publication Data

US 2008/0054753 A1 Mar. 6, 2008

(51) Int. Cl.
*H02K 13/00* (2006.01)

(52) U.S. Cl. ...................................... 310/252; 310/248

(58) Field of Classification Search ......... 310/248–253; 29/826

See application file for complete search history.

(56) References Cited

U.S. PATENT DOCUMENTS

| | | | | | |
|---|---|---|---|---|---|
| 4,000,430 | A | * | 12/1976 | Bely et al. | 310/251 |
| 4,314,172 | A | * | 2/1982 | Diepers | 310/248 |
| 4,415,635 | A | * | 11/1983 | Wilsdorf et al. | 428/611 |
| 4,443,726 | A | * | 4/1984 | Ikegami et al. | 310/248 |
| 5,168,620 | A | * | 12/1992 | Denney et al. | 29/597 |
| 5,387,831 | A | * | 2/1995 | Yang | 310/242 |
| 5,447,681 | A | | 9/1995 | Tai Seung et al. | |
| 5,657,842 | A | * | 8/1997 | Krenkel et al. | 191/45 R |
| 5,701,046 | A | * | 12/1997 | Kammerer et al. | 310/251 |
| 6,091,178 | A | * | 7/2000 | Spangenberg | 310/248 |
| 6,246,144 | B1 | * | 6/2001 | Hockaday et al. | 310/242 |
| 6,787,963 | B2 | * | 9/2004 | Tanaka et al. | 310/248 |
| 6,815,862 | B2 | * | 11/2004 | Inukai et al. | 310/251 |
| 6,909,219 | B2 | * | 6/2005 | Takahashi et al. | 310/251 |
| 2004/0000836 | A1 | * | 1/2004 | Okubo et al. | 310/252 |
| 2004/0212272 | A1 | * | 10/2004 | Arai et al. | 310/251 |
| 2005/0212376 | A1 | * | 9/2005 | Niimi et al. | 310/251 |
| 2006/0028091 | A1 | * | 2/2006 | Xu | 310/239 |

FOREIGN PATENT DOCUMENTS

| | | |
|---|---|---|
| EP | 1244186 | 9/2002 |
| JP | 2051345 | 2/1990 |

OTHER PUBLICATIONS

PCT International Search Report dated Jul. 4, 2008.

* cited by examiner

*Primary Examiner*—Thanh Lam
(74) *Attorney, Agent, or Firm*—McCarter & English, LLP

(57) ABSTRACT

Systems and methods for electrical component, e.g., brush, manufacture are provided that control grain orientation. The systems and methods utilize hot pressing techniques to enhance the properties and functionalities of the electrical components/brushes. An intermediate work product characterized by a grain orientation is initially formed through a conventional pressing technique. The conventionally-pressed intermediates are positioned within a cavity/die with the grain orientation in a predetermined orientation relative to the hot press force to be applied thereto. The hot pressed final product exhibits superior resistivity, strength and apparent density/durability. Surface features may be formed on the face(s) of the final work product during the hot pressing step that cannot be achieved in conventional processing techniques. Advantageous articles of manufacture, e.g., brushes and brush assemblies, are also disclosed.

6 Claims, 3 Drawing Sheets

GRAIN ORIENTATION CONTROL THROUGH HOT PRESSING TECHNIQUES

BACKGROUND

1. Technical Field

The present disclosure is directed to systems and methods for brush manufacture and, more particularly, to systems and methods that control grain orientation in components, assemblies and other articles of manufacture. Exemplary systems and methods disclosed herein utilize hot pressing techniques to enhance the properties and/or functionalities of brushes and other electrical components.

2. Background Art

In the field of motor design, a brush is provided to interact with, i.e., contact, a rotating commutator. Brushes are typically fabricated from carbon and/or copper-containing powder mixtures and brush design is generally recognized as being critical to the operation and durability of the motor assembly. A conventional method for manufacturing a graphite brush is disclosed in Japanese Laid-Open Patent Publication No. 90-51345. The brush is manufactured from a mixture of powders including an aluminum abrasive, molybdenum disulfide and tungsten disulfide, each powder consisting of particles having diameters of less than 50 μm. The powders are combined in a solution of adhesives, pulverized and prepared with powders having a diameter 100 μm. The total mixture is then compressed at a pressure of 0.25 tons/cm$^2$ and fired at a temperature of 700° C.

U.S. Pat. No. 5,447,681 to Seung et al. discloses a method for manufacturing a metal graphite brush that includes the steps of preparing natural graphite powders, wet-mixing the graphite powders with adhesives, pulverizing the mixed powders to diameters of less than 200 μm, press-molding the powders under a pressure of 2-3 ton/cm$^2$ and heating at a temperature 700° C. A lead wire is then attached to the press-molded component.

Despite efforts to date, techniques for fabrication of brushes imposes significant limitations on the design, geometry, structural features and properties/performance. Moreover, brushes and brush assemblies fabricated according to conventional processing techniques/methodologies are characterized by durability issues based, at least in part, on density limitations associated with conventional fabrication techniques. These and other shortcomings and limitations are overcome by the techniques, methods and articles of manufacture disclosed herein.

SUMMARY

The present disclosure is directed to systems and methods for manufacture of electrical components, e.g., brush manufacture, and, more particularly, to systems and methods that enable and/or support advantageous control of grain orientation in manufacture of such components, e.g., brush manufacture. Exemplary systems and methods disclosed herein utilize hot pressing techniques to enhance the properties and/or functionalities of brushes and other electrical components, e.g., carbon and/or copper-containing components. The disclosed techniques and methodologies have wide ranging applications, including the manufacture and/or fabrication of pressed-to-size brushes that are anisotropic, i.e., brushes that have differing physical properties based on the direction of measurement.

According to exemplary embodiments of the present disclosure, a powder mixture is initially pressed in a conventional manner to form an intermediate work product. The conventional pressing step establishes a grain orientation within the intermediate work product that is perpendicular to the direction of the compression forces applied thereto during the conventional pressing process. Thereafter, the conventionally-pressed intermediate work product is further processed by a hot pressing technique, wherein the initial grain orientation of the intermediate work product is maintained while compression forces are applied in the hot pressing step. Through the hot pressing step, the density of the work piece is further increased, thereby enhancing the durability thereof, e.g., when employed as a brush or other electric component. Superior functional properties, such as specific resistivity and strength, are also imparted to the work piece through the disclosed hot pressing technique.

Thus, an advantageous fabrication technique is disclosed wherein a powder mixture is provided and processed to form a work piece having desirable physical and/or functional properties. The contents and percentage composition of the powder mixture are not significant to the disclosed fabrication technique. Indeed, the disclosed fabrication technique may be applied to any mixture/blend, e.g., conventional carbon and/or copper-containing powder mixtures. Thus, as is known in the art, different mixtures/blends are routinely employed to fabricate brushes having desired physical properties and functional characteristics, any of which may be employed according to the disclosed fabrication technique. Alternative powder mixtures may also be employed.

The powder mixture is initially subjected to a conventional pressing technique to form an intermediate work product. The conventional pressing step establishes a grain orientation within the intermediate work product such that grains are substantially perpendicular to the force vectors applied to the powder mixture. According to conventional fabrication techniques, the conventional pressing technique is generally followed by finishing steps, e.g., finish grinding and the like. However, according to the advantageous fabrication technique of the present disclosure, the conventionally-pressed intermediate work product is subjected to a hot pressing step wherein the grains of the intermediate work product are maintained regardless of the force vectors associated with the hot pressing process.

Through the hot pressing step, the properties of the intermediate work product are enhanced. In addition, the hot pressing step may be used (i) to impart advantageous surface features to the work piece that are not achievable in conventional pressing techniques, (ii) to capture ancillary members/components, e.g., a lead wire/flex member, in ways not possible with conventional pressing techniques, and/or (iii) to form advantageous multi-layer brush assemblies. Indeed, the disclosed fabrication techniques and methods may be employed to form press-to-fit brush members that are not achievable using conventional compression molding techniques.

In addition to the advantageous fabrication techniques disclosed herein, the present disclosure is directed to advantageous electrical components, e.g., brushes and brush assemblies, that are formed, in whole or in part based on the disclosed fabrication techniques. Thus, the present disclosure provides brushes and brush assemblies that define a first axis, wherein the internal grains of the brush/brush assembly are substantially aligned with the first axis and wherein molded surface features are formed on at least one face that is traversed by such first axis. In a further exemplary embodiment of the present disclosure, a brush assembly is provided that is characterized by a plurality of distinct conventionally-pressed layers, wherein the layers are bonded to each other and wherein the grains of the individual layers can be controlled independent of each other. In exemplary embodiments of the disclosed multi-layer brush assembly, a plurality of distinct intermediate work pieces (e.g., three) are formed by conventional pressing techniques and then introduced to a die for simultaneous hot pressing, thereby forming the desired multi-layer brush assembly. Multi-layer brush assemblies have particular applicability in washing machine applications, as is well known to persons skilled in the art.

Additional features, functions and advantages of the disclosed fabrication techniques/methods and the articles of manufacture formed thereby will be apparent from the detailed description which follows, particularly when read in conjunction with the appended figures.

BRIEF DESCRIPTION OF THE FIGURE(S)

To assist those of ordinary skill in the art in making and using the disclosed fabrication techniques and articles of manufacture, reference is made to the accompanying figures, wherein.

DESCRIPTION OF EXEMPLARY EMBODIMENTS

Systems and methods for manufacture of electrical components, e.g., brushes, and advantageous electrical components, e.g., brushes/brush assemblies, are provided herein. The disclosed systems, methods and articles of manufacture advantageously control grain orientation in the manufacturing process such that advantageous physical and functional properties are imparted thereto. The disclosed systems and methods utilize hot pressing techniques to provide enhanced properties and/or functionalities to brushes and other electrical components, e.g., carbon and/or copper-containing systems, and find wide ranging applications, including the manufacture and/or fabrication of pressed-to-size brushes.

Figure 1:
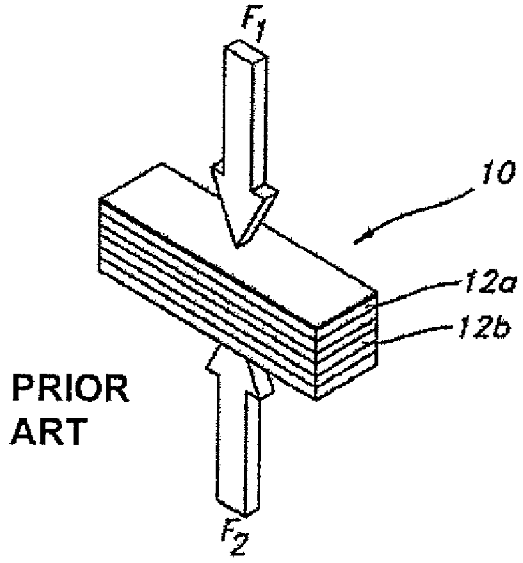
FIG. 1 is a schematic depiction of a conventional pressing step according to the present disclosure.

According to exemplary embodiments of the present disclosure, a powder mixture is initially pressed in a conventional manner to form an intermediate work product. With reference to FIG. 1, a conventional pressing step is schematically depicted. A substantially axial compression force, as represented by opposed arrows $F_1$ and $F_2$, is applied to a powder mixture 10 that is contained within a cavity or die (not pictured). As schematically depicted in FIG. 1, application of the compression force causes grains within the mixture to align in a substantially perpendicular orientation. Grain alignment is schematically depicted by a series of stacked planar regions 12*a*, 12*b*, etc. As is known in the art, conventional pressing of powder mixtures, e.g., carbon and/or copper-containing powder mixtures used in the fabrication of brushes/brush assemblies, necessarily establishes a grain orientation that is perpendicular to the force vectors applied thereto. Moreover, as is also known in the art, due to limitations associated with conventional pressing equipment, surface features can only be applied to or formed on the work piece during conventional pressing techniques on the top or bottom surface thereof. Attempts to apply/form surface features on side walls of the work piece are generally limited and/or foreclosed by the nature of the conventional pressing operation.

The operating conditions for the conventional pressing step may vary according to various process parameters, e.g., powder mixture, equipment capabilities, target geometry, and the like. The degree to which work piece density may be increased through conventional pressing techniques is generally restricted due to various processing limitations, e.g., the potential for cracked dies and/or parts sticking to tooling if the press tonnages are increased beyond certain limits.

Figure 2B:
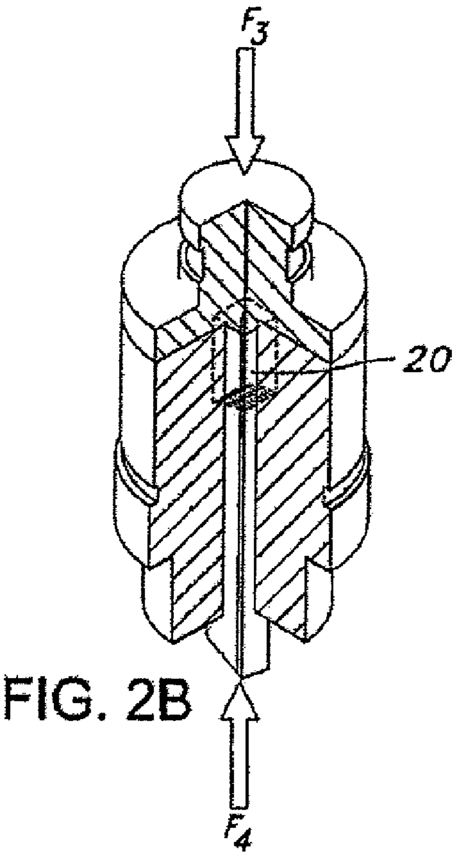
FIGS. 2A-2C are schematic diagrams showing an exemplary hot pressing technique for use in hot pressing an intermediate work piece according to the present disclosure.
Figure 2A:
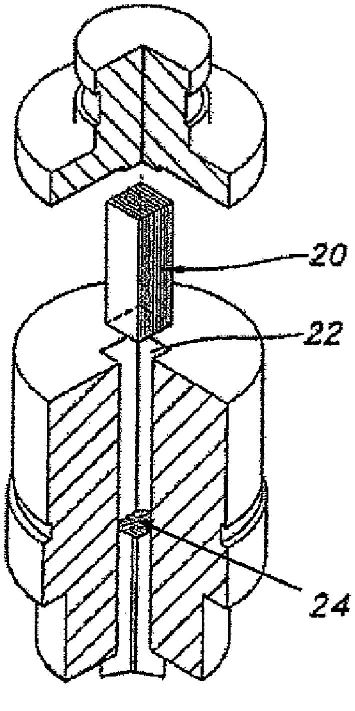
Figure 2C:
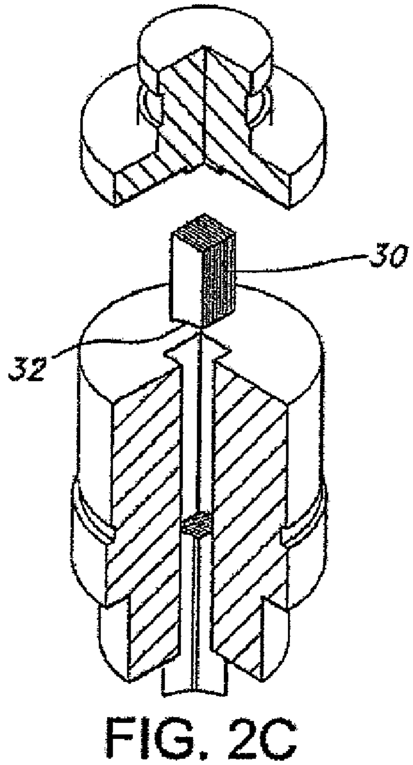

According to the present disclosure, the intermediate work product formed through conventional pressing is further processed in an advantageous hot pressing step to enhance the properties thereof and, if desired, to provide beneficial surface features, combine ancillary components (e.g., a lead wire/flex), and/or form advantageous multi-layer articles, e.g., a multi-layer brush assembly. The intermediate work piece is thus positioned in a cavity/die that is adapted for hot pressing, as described herein. With reference to FIGS. 2A-2C, the interaction between an exemplary intermediate workpiece and an exemplary cavity/die in a hot pressing step is schematically depicted. Individual cavities/dies may be sized/configured so as to receive insets that provide desired geometric properties, surface features and/or accommodate positioning of ancillary component(s) that are to be joined to and/or captured by the work piece, e.g., a lead wire/flex.

Of note, the intermediate work piece may be introduced to the hot pressing cavity/die such that the grains formed in the previously completed, conventional pressing step are substantially aligned with the axis of the die, i.e., parallel to the force vector associated with the hot pressing step, or are substantially perpendicular to the force vector associated with the hot pressing step. In circumstances where the grains are positioned parallel to the hot pressing force vector, there are two degrees of freedom. Thus, with reference to FIGS. 2A-2C, intermediate work piece 20 is introduced to a hot pressing cavity/die 22 that includes a surface treatment geometry 24 formed on a lower face thereof. As clearly seen in FIG. 2A, the grains of the intermediate work piece 20 are advantageously aligned with force vectors $F_3$ and $F_4$ within die/cavity 22 (see force vectors in FIG. 2B). A hot pressing force is applied to intermediate work piece 20 (as shown in FIG. 2B), typically at an elevated hot pressing temperature, for a hot pressing treatment period sufficient to achieve the desired effect(s) on the intermediate work piece 20. A final work product 30 is formed with an advantageous surface effect 32 formed on the face that was in contact with surface treatment geometry 24. In the exemplary embodiment of FIGS. 2A-2C, the surface effect 32 takes the form of an arcuate, ridged surface, although the present disclosure is not limited to such exemplary surface effect, as will be readily apparent to persons skilled in the art. Indeed, surface effects may be achieved on the top, bottom and/or side surfaces of the intermediate work piece (and ancillary components may be introduced to the intermediate work piece, e.g., a lead wire) during the hot pressing step disclosed herein.

Figure 3:
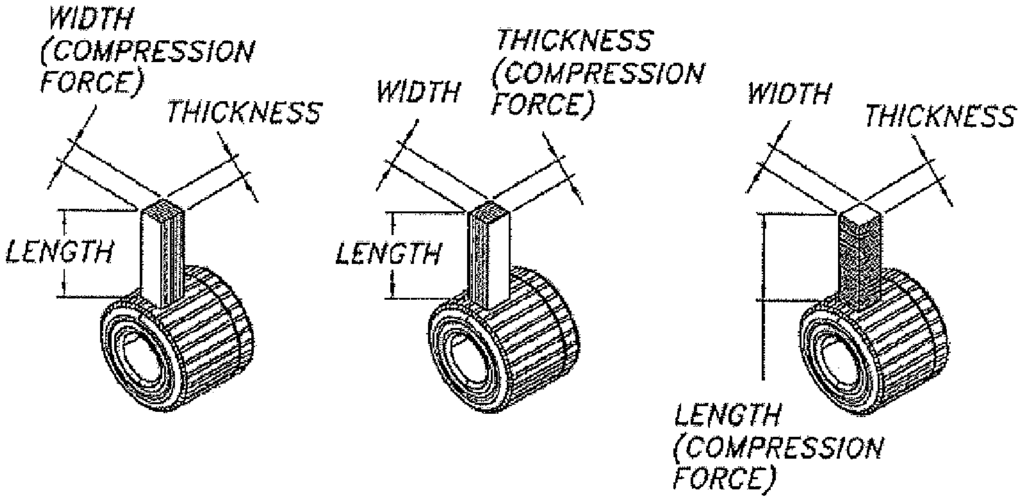
FIG. 3 is a schematic illustration of three work pieces (brushes) that are distinguished by the orientation of the grains as they would be defined relative to a commutator.

With reference to FIG. 3, three exemplary brushes are schematically depicted to illustrate potential grain orientations. In the left-most view, the grains are aligned having a circumferential grain orientation, i.e., a "G.C." orientation. In the middle view, the grains are aligned with an axial grain orientation, i.e., a "G.A." orientation. Finally, the right-most view illustrates an exemplary brush assembly wherein the grains form/define a tangential grain orientation, i.e., a "G.T." orientation.

As with the conventional pressing step discussed above, the processing parameters associated with the hot press step may be varied without departing from the spirit or scope of the present disclosure. Processing conditions will depend on such variables as the composition of the intermediate work piece, the desired geometric properties of such work piece at the conclusion of the hot pressing step, and the desired physical/functional properties thereof.

With further reference to FIG. 3, it is noted that surface properties may be advantageously established through the disclosed hot pressing technique on the top and/or bottom faces of the G.C. and G.A. brushes that could not be effectively achieved with conventional pressing techniques. While it is possible to machine surface features onto the end faces of a work piece after conventional pressing, it is not possible to form detailed and/or non-planar surface features on the faces of the work piece that are perpendicular to the grain orientation. Moreover, the advantageous fabrication techniques of the present disclosure facilitate the formation of detailed and/or non-planar surface features in the hot pressing step, thereby greatly enhancing the effectiveness, flexibility and utility of electrical component fabrication, e.g., brush fabrication.

Figure 4:
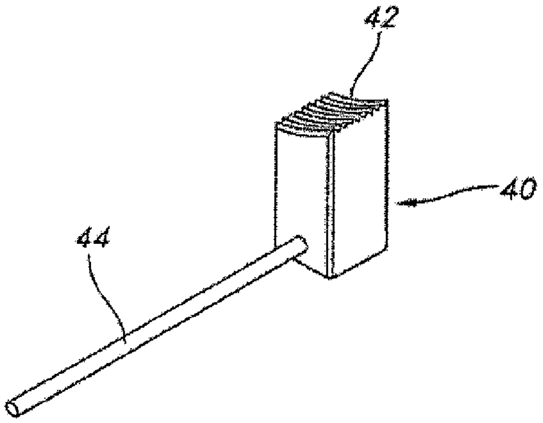
FIG. 4 is a plan view of an exemplary brush with flex fabricated according to the advantageous method of the present disclosure.

With reference to FIG. 4, an exemplary brush 40 is depicted that includes an intricate and non-planar surface geometry 42 on a face that is perpendicular to the grain orientation thereof. Such non-planar surface geometry 42—which may be termed a "press-to-fit" geometry—is advantageously defined during the hot pressing step by forcing the intermediate work piece (with grains aligned with the force vector) into a mold having the desired geometry. In addition, a lead wire/flex 44 is advantageously introduced to and captured by brush 40 in an orientation that is perpendicular to the grain orientation of the brush 40. As with non-planar surface geometry 42, introduction of a lead wire 44 in a perpendicular orientation as shown in FIG. 4 cannot be achieved with conventional pressing techniques.

Figure 5:
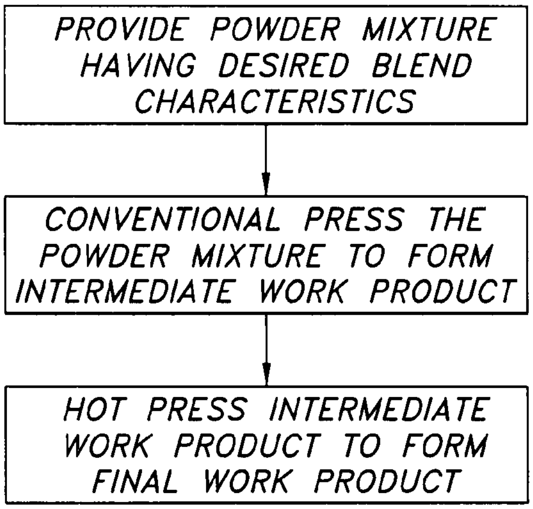
FIG. 5 is a flow chart illustrating an exemplary fabrication technique according to the present disclosure.

With reference to FIG. 5, an exemplary flow chart for the disclosed fabrication technique is provided. As shown therein, the process generally involves:

1. Providing a powder mixture having desired blend characteristics, e.g., a carbon and/or copper-based powder mixture;
2. Conventionally pressing the powder mixture to form an intermediate work product; and
3. Hot pressing the intermediate work product to form a final work product.

Operating conditions associated with the hot pressing step will vary depending on a host of factors, e.g., the powder constituents and relative percentages thereof, size and geometry of the intermediate work product, etc. Generally, the hot pressing step is conducted at temperatures that range from about 125° to 1000° F., at pressures that range from about 4000 to 50,000 psi, and for processing times sufficient to achieve the desired work product design/functionality.

Through the hot pressing step, the density of the work piece is further increased relative to the density achieved by way of a conventional pressing step, thereby enhancing the durability of the work piece, e.g., when employed as a brush/brush assembly. Superior functional properties such as specific resistivity/lower resistance and strength are also imparted to the work piece through the disclosed hot pressing technique. The final work piece may also demonstrate increased oxidation resistance, longer life and, as noted previously, may feature complicated/advantageous shapes/surface features. Exemplary advantageous results achieved through the fabrication process of the present disclosure are set forth in TABLE 1 herein below. The "control" results are reflected at the left for each physical property, and the results according to the present disclosure are set forth at the right.

As shown above, the disclosed fabrication method that involves hot pressing a conventionally-pressed intermediate work product yields a work piece with superior properties, with testing showed excellent improvements in all relevant properties. The disclosed fabrication method yielded products with reduced resistance, greater strength, and higher density (which translates to enhanced durability). The superior properties imparted through the disclosed fabrication technique are effective across a variety of powder mixtures, and the contents and percentage composition of the such powder mixtures, e.g., carbon and/or copper-containing mixtures, are not significant to the superior results achieved thereby. Indeed, the disclosed fabrication technique may be applied to any carbon and/or copper-containing powder mixture/blend.

Figure 6:
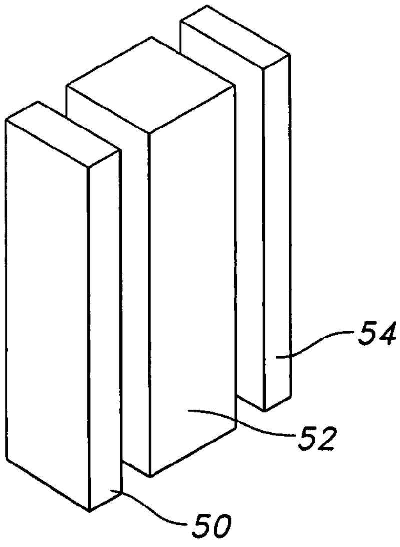
FIG. 6 is a depiction of three individual conventionally pressed components in a side-by-side arrangement.
Figure 7A:
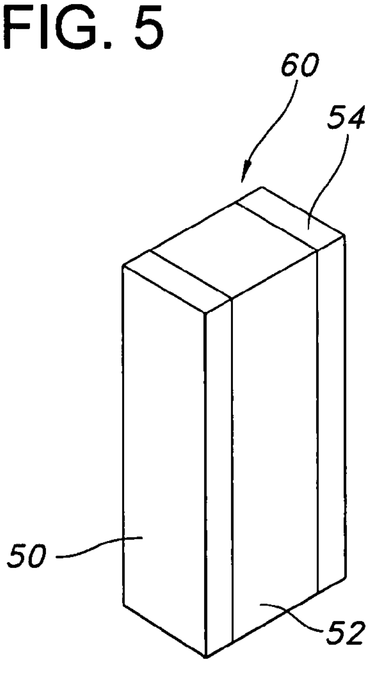
FIGS. 7A and 7B are depictions of a multi-layered brush assemblies formed according to the present disclosure.

With reference to FIGS. 6 and 7A, the advantageous utility of the disclosed fabrication technique in forming a multilayer brush assembly is illustrated. In FIG. 6, three distinct conventionally-pressed intermediate work products 50, 52, 54 are shown in a side-by-side position. Each of the intermediate work products is characterized by a grain orientation that is independent of the potential line of contact with an adjacent work product. Indeed, one or more of the elements that are positioned in a side-by-side relationship may be devoid of grain orientations. By positioning the intermediate work pieces in a cavity/die for hot pressing, as disclosed herein, a multi-layered brush assembly 60 as shown in FIG. 7A is fabricated. An adhesive material may be placed between adjacent intermediate work products, if desired.

Figure 7B:
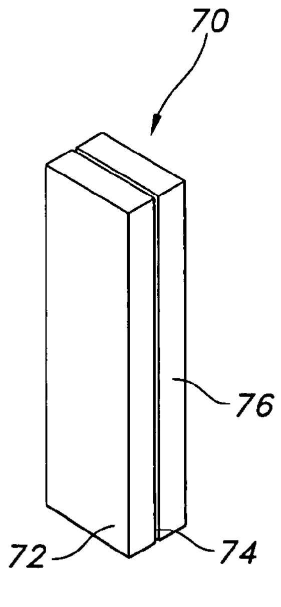

Of note, in exemplary embodiments of the present disclosure, one or more of the layers need not take the form of a pressed work product. For example, as shown in FIG. 7B, outer layers 72, 76 may surround an intermediate layer 74 that takes the form of a tape, powder and/or wafer of a completely different material, to form an advantageous multi-layer assembly 70. The multi-layer brush assemblies of FIGS. 7A and 7B benefit from the attributes of the individual intermediate work products and are particularly useful in high intensity applications, e.g., washing machine motors or the like.

Thus, the present disclosure provides advantageous systems and methods for fabrication of carbon-based members, e.g., brushes, and advantageous articles of manufacture fabricated thereby. Although the disclosed systems, methods and articles of manufacture have been described with reference to exemplary embodiments thereof, the present disclosure is not limited by such exemplary embodiments. Rather, the disclosed systems, methods and articles of manufacture are susceptible to modifications, enhancements and/or variations without departing from the spirit or scope of the present disclosure. Such modifications, enhancements and/or variations are expressly encompassed within the scope of the present invention.

The invention claimed is:

1. An article of manufacture, comprising:

a. a pressed body that includes an internal grain orientation tat defines an axis, wherein the internal grain orientation was formed during a first pressing of the body; and b. at least one non-machined, non-planar surface feature on a face perpendicular to the axis that was formed during pressing of the body, wherein the non-machined, non-planar surface feature was formed during a second pressing of the body.

2. An article of manufacture according to claim 1, wherein the pressed body is a brush.

3. An article of manufacture according to claim 2, wherein the brush is multi-layered.

4. An article of manufacture according to claim 1, further comprising a lead wire, wherein the lead wire was joined to a face of the pressed body in a perpendicular orientation relative to the internal grain orientation during the second pressing.

5. An article of manufacture according to claim 1, wherein the second pressing is a hot pressing.

6. An article of manufacture according to claim 4, wherein the lead wire was joined to a face of the pressed body in a perpendicular orientation relative to the internal grain orientation.

* * * * *